Patented Jan. 8, 1952

2,581,820

UNITED STATES PATENT OFFICE 2,581,820

SOLDERING FLUX

Benjamin M. Stright, Rochester, N. Y., assignor to General Railway Signal Company, Rochester, N. Y.

No Drawing. Application June 1, 1949, Serial No. 96,631

7 Claims. (Cl. 148—23)

This invention relates to fluxes and particularly to fluxes for soldering operations where it is desired to form a permanent bond between the metal and solder.

The object of the invention is to provide an improved soldering flux which will be effective in removing surface films and securing a close and permanent bond and at the same time will leave no corrosive residues and by-products injurious to the soldered joint.

Generally speaking, the desirable attributes of a soldering flux are the efficient removal of films of oxides and infusible materials from the surfaces of the base metal and the molten solder so as to create metal surface conditions for the solder to flow freely and adhere with an intimate metal-to-metal contact with the parts to be united over a desired area, and also the protection of the surfaces so cleaned and prepared from further oxidation or contamination during the soldering operation, while at the same time permitting the flux to be displaced and the molten solder to flow freely and spread over the desired area. Also, a satisfactory flux for many soldering operations, more particularly in connection with electrical connections between wires, terminals and the like, should not leave a residue which is corrosive or hygroscopic. A residue that is corrosive will in time cause damaging corrosion of the parts adjacent the soldered joint, and often cause the soldered connection itself to weaken or break down. A hygroscopic residue permits the accumulation of moisture, which tends to form a solution of the residue and make it more corrosive in its action, to accelerate normal oxidation process in and around the soldered connection, and to set up conditions for continuing deterioration of the soldered connections by electrolytic action. Further, for efficient use in many soldering operations, such as hot iron soldering, dipping of electrical contacts and the like, it is desirable that the flux should be rapid in its action, so that there is no significant time restriction upon the successive motions of the operator in applying the flux, solder and heat, which might otherwise slow up the soldering operation and tend to give a larger proportion of imperfect soldered joints where the manipulation is faulty. Finally, the flux should be relatively cheap, easily handled and applied, non-toxic, and non-injurious to the skin, and free of objectionable odors or fumes.

The flux of this invention comprises an organic acid, an amine or amide, and a wetting agent in a suitable vehicle. For ordinary soldering operations a flux in the liquid form is generally preferable; and a typical formula for such a liquid flux comprises

| | Per cent by volume |
|---|---|
| Lactic acid (85%) | 15 to 20 |
| Alcohol | 42.5 to 40 |
| Distilled water | 42.5 to 40 | to which is added

| | Per cent by weight |
|---|---|
| Urea | 2 to 6 |
| Wetting agent | .05 to 0.1 |

With regard to the above ingredients, the proportions of water and alcohol as the vehicle is subject to considerable variations dependent upon the type of soldering operation and use of the flux. Water tends to boil and cause a bubbling or sputtering action during the soldering operation, and for many uses it is desirable to include a substantial amount of alcohol to restrict this action. For some applications it may be expedient to use alcohol entirely for the vehicle. Alcohol, however, tends to evaporate when the flux is used in the ordinary way in an open container, and a certain amount of water is desirable to restrict this rate of evaporation. Approximately equal proportions of water and alcohol as indicated in the above formula represent a compromise which has been found to be acceptable for the average or ordinary soldering conditions.

Distilled water is preferably used to eliminate chlorides, calcium, magnesium, and iron salts often present in ordinary water, which would tend to leave a residue capable of setting up conditions for galvanic action in the presence of moisture. Completely denatured grain alcohol is preferred, but other types of alcohols may be used so long as they are compatible with the flux ingredients and will evaporate quickly during the soldering operation without leaving an objectionable residue, with the exception of methyl alcohol, which is not suitable due to its toxic effect.

The function of the wetting agent, such, for example, as Santomerse, is to reduce the surface tension of the fluxing agents in solution so that these fluxing agents will spread and flow readily and quickly over the surface to be cleaned. Santomerse is a surface active wetting agent. Its composition is a salt of an aromatic sulphonic acid. Wetting agents of the alkyl aryl sulphonate type are particularly effective in promoting surface active properties as well as detergent properties when used in the flux formula. Detergent properties are important since impurities lifted from the surface of the metal by the flux are not readily deposited. The wetting agent should also be chemically stable to acids and alkalies of considerable strength.

The flux of this invention may also be made with a paste vehicle. A suitable formula for the flux in its paste form is as follows:

|  | Grams |
|---|---|
| Lactic acid | 20-40 |
| Urea | 2-6 |
| Wetting agent | 0.10 |
| Petrolatum (refined) | 50 |

The active fluxing agents in this flux are the lactic acid and urea. Lactic acid is found preferable to other organic acids, such as oleic and palmitic, because it is inexpensive, non-toxic, and leaves very little residue, which is essentially non-corrosive and definitely non-hygroscopic. The fluxing action of lactic acid in cleaning the surfaces of the base metal and molten solder is relatively effective and persistent under the application of heat, more particularly for copper, brass and bronze, but has some limitations in its effectiveness in cleaning some metal surfaces, such as steel. Also, lactic acid in comparison with other fluxing agents does not seem to have the desirable reaction with the surface of the base metal to prepare it for the most effective flow and adhesion of the molten solder.

The amine or amide combined with the organic acid in the flux of this invention is preferably urea, because it is comparatively inexpensive, non-irritating to the skin, and non-offensive in odor when volatilized during the soldering operation. Other amines and amides may be used, such as acetamide and ethylene diamine. Urea is an active and effective fluxing agent for cleaning and preparing base metal surfaces for soldering, but decomposes or volatilizes quickly when heated to the temperature for satisfactory soldering. Consequently, urea alone as a rule does not maintain a clean surface condition long enough for the solder to spread freely and give satisfactory results in ordinary soldering operations, and is largely limited to quick spot soldering.

I have found that lactic acid and urea together cooperate in some way to give a much better fluxing action than either alone. One satisfactory and accepted way of determining fluxing action is the conventional spreading test, where a given quantity of solder is heated on a fluxed metal surface at a controlled temperature and pressure, and the area of spread of this solder is observed. I have found, upon applying this spreading test to various surface conditions of metals, that the flux of this invention, including both lactic acid and urea, will give approximately twice as much spread as either lactic acid or urea alone. It has also been observed that the spread of this flux is at least double the spread obtained with various other commercial fluxes that have been tested. The same superiority in fluxing action is noted in the results of ordinary hot iron and dip soldering for wire terminals and the like, where the extent of spread of the solder over the surfaces and throughout the strands of wire may be readily observed.

It has been recognized that lactic acid and urea are both fluxing agents, and it has been observed that each is effective with certain limitations when used separately. My investigations show that a superior fluxing action is obtained by using both lactic acid and urea in certain approximate proportions. The reasons for this superior effect are not thoroughly understood. In general, the results are attributed to the fact that the combined and concurrent fluxing action of lactic acid and urea gives a metal surface that is cleaner and better prepared for spreading of the molten solder than either alone, and to the fact that the surface condition obtained by urea is maintained, in spite of its volatile character, by the presence of the lactic acid until there is time for the solder to spread over the soldering areas. Possibly there is some chemical reaction between the lactic acid and the urea when heated to the soldering temperature which accentuates in some unknown manner the fluxing action to give a surface condition not obtainable with either alone.

Although the theory of the interactions and effects of lactic acid and urea when used together are uncertain, the results of spreading tests and ordinary soldering operations have demonstrated that their combined action, together with a wetting agent, gives rapidly and effectively a superior surface condition for the flow and adhesion of the molten solder, without any significant residue which is either corrosive or hygroscopic. Tests have been made on a large number of metal surfaces of silver, copper, brass, bronze, tin plate, nickel plate, cadmium plate, and steel; and in each case there was obtained a bright and clean soldered connection, which without any extra surface treatment for the residue gave no indication of corrosion or deterioration at or around the soldered joint after exposure in a humid atmosphere for an extended period of time, in marked contrast to other commercial soldering fluxes tested under comparable conditions.

With regard to the proportions of lactic acid and urea for suitable fluxing action under ordinary soldering conditions, my investigations indicate that a certain amount of lactic acid, in the order of 15 to 20% by volume in the liquid flux, is needed to obtain the desired cleaning effect and surface protection and that additional quantities give no significant improvement in the results. Similarly, quantity of urea in the order of 2 to 6% by weight in the liquid flux has been found to give satisfactory results, while no significant improvement is obtained by the use of urea much in excess of this amount. Consequently, although the relative proportions of lactic acid and urea do not seem to be critical, the quantities indicated are preferably employed to obtain the desired fluxing action economically.

I claim:

1. A soldering flux for metals leaving an essentially non-corrosive and non-hygroscopic residue consisting of a vehicle including a wetting agent, and a combination of active agents consisting essentially of a major proportion of lactic acid and a minor proportion of a compound selected from the group consisting of an amine and an amide, both the acid and the compound having fluxing characteristics and acting jointly as fluxing agents, said amine or amide fluxing agent being selected from the group consisting of urea, acetamide and ethylene diamine.

2. An essentially non-corrosive soldering flux for metal soldering, consisting of a vehicle including a wetting agent, and a combination of active agents consisting essentially of a major proportion of lactic acid and a minor proportion of urea acting jointly as fluxing agents, said urea constituting at least two percent by weight of the total flux.

3. An essentially non-corrosive soldering flux for metals consisting of a liquid vehicle of water and alcohol including a wetting agent, and a combination of active agents consisting essentially of a major proportion of lactic acid and a minor proportion of urea in said vehicle to act jointly as fluxing agents and constituting by weight a minor proportion of the total flux, said urea constituting from 2 to 6 percent by weight of the total flux.

4. A soldering flux of the non-corrosive type consisting essentially of a liquid vehicle including a wetting agent, urea as one fluxing agent constituting from 2 to 6 percent of the total flux, and lactic acid as an additional fluxing agent in a major proportion relative to said urea.

5. An essentially non-corrosive soldering flux for metals consisting of a liquid vehicle of water and alcohol including less than one percent by weight of a wetting agent, and lactic acid and urea in said vehicle acting jointly as fluxing agents and constituting by weight a minor proportion of the total flux, the said lactic acid being in greater proportion than the said urea.

6. A liquid soldering flux of the non-corrosive type consisting essentially of 80 to 85 percent by volume of a liquid vehicle of water and alcohol, 15 to 20 percent of lactic acid by volume, and 2 to 6 percent of urea by weight.

7. A liquid soldering flux of the non-corrosive type consisting essentially of 80 to 85 percent by volume of a liquid vehicle of distilled water and grain alcohol, 15 to 20 percent of lactic acid by volume, 2 to 6 percent of urea by weight, and a fraction of one percent of a wetting agent of the alkyl aryl sulphonate type.

BENJAMIN M. STRIGHT.

REFERENCES CITED

The following references are of record in the file of this patent:

UNITED STATES PATENTS

| Number | Name | Date |
|---|---|---|
| 325,579 | Waite | Sept. 1, 1885 |
| 1,785,135 | McQuaid | Dec. 16, 1930 |
| 1,785,155 | Taylor | Dec. 16, 1930 |
| 1,929,895 | McBride | Oct. 10, 1933 |
| 1,989,557 | Muller | Jan. 29, 1935 |
| 2,089,095 | Magill | Aug. 3, 1937 |
| 2,095,335 | Kofke | Oct. 12, 1937 |
| 2,480,723 | Evans et al. | Aug. 30, 1949 |

FOREIGN PATENTS

| Number | Country | Date |
|---|---|---|
| 353,758 | Great Britain | July 30, 1931 |
| 614,708 | Germany | June 17, 1935 |